US008413449B2

(12) United States Patent
Haehnle et al.

(10) Patent No.: US 8,413,449 B2
(45) Date of Patent: Apr. 9, 2013

(54) GAS TURBINE HAVING AN IMPROVED COOLING ARCHITECTURE

(75) Inventors: Hartmut Haehnle, Kuessaberg (DE); Russell Bond Jones, Jupiter, FL (US); Gregory Vogel, Palm Beach Gardens, FL (US); Remigi Tschuor, Windisch (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 12/857,171

(22) Filed: Aug. 16, 2010

(65) Prior Publication Data

US 2011/0110761 A1 May 12, 2011

Related U.S. Application Data

(63) Continuation of application No. PCT/EP2009/051763, filed on Feb. 16, 2009.

(30) Foreign Application Priority Data

Feb. 20, 2008 (CH) ........................................ 0244/08

(51) Int. Cl.
*F02C 1/00* (2006.01)

(52) U.S. Cl. ............................................ 60/755; 60/752

(58) Field of Classification Search ............. 60/752–760
See application file for complete search history.

(56) References Cited

U.S. PATENT DOCUMENTS

| | | | | |
|---|---|---|---|---|
| 3,652,181 | A | 3/1972 | Wilhelm | |
| 4,872,312 | A | 10/1989 | Iizuka et al. | |
| 4,932,861 | A | 6/1990 | Keller et al. | |
| 5,024,058 | A * | 6/1991 | Shekleton et al. | 60/752 |
| 5,025,622 | A * | 6/1991 | Melconian | 60/39.464 |
| 5,244,380 | A * | 9/1993 | Dobbeling et al. | 431/8 |
| 5,388,412 | A | 2/1995 | Schulte-Werning et al. | |
| 5,560,197 | A * | 10/1996 | Ansart et al. | 60/800 |
| 5,588,826 | A | 12/1996 | Dobbeling et al. | |
| 6,018,950 | A | 2/2000 | Moeller | |
| 6,122,917 | A * | 9/2000 | Senior | 60/752 |
| 6,134,877 | A * | 10/2000 | Alkabie | 60/800 |
| 7,926,278 | B2 * | 4/2011 | Gerendas et al. | 60/725 |
| 2002/0069644 | A1 * | 6/2002 | Stuttaford et al. | 60/772 |

(Continued)

FOREIGN PATENT DOCUMENTS

| | | | |
|---|---|---|---|
| DE | 2356722 | A1 | 5/1975 |
| DE | 19644378 | A1 | 4/1998 |

(Continued)

OTHER PUBLICATIONS

International Search Report for PCT/EP2009/051763 mailed on Jun. 10, 2009.

*Primary Examiner* — Gerald Sung
(74) *Attorney, Agent, or Firm* — Leydig, Voit & Mayer, Ltd.

(57) ABSTRACT

A thermal machine includes a hot gas channel; a shell bounding the hot gas channel; a cooling shirt surrounding the shell; and a cooling channel disposed between the shell and the cooling shirt and configured to convection cool the hot gas channel with a cooling medium, wherein the cooling shirt includes at least one local divergence in the guidance of the cooling medium so as to compensate for non-uniformities in at least one of a thermal load on the shell and a flow of the cooling medium in the cooling channel.

12 Claims, 6 Drawing Sheets

U.S. PATENT DOCUMENTS

| | | | | |
|---|---|---|---|---|
| 2002/0100281 | A1* | 8/2002 | Hellat et al. | 60/725 |
| 2005/0097894 | A1* | 5/2005 | Tiemann | 60/772 |
| 2007/0062198 | A1 | 3/2007 | Huth et al. | |
| 2007/0180827 | A1 | 8/2007 | Dawson et al. | |

FOREIGN PATENT DOCUMENTS

| | | | |
|---|---|---|---|
| EP | 0239020 | A2 | 9/1987 |
| EP | 0284819 | A2 | 10/1988 |
| EP | 0321809 | A1 | 6/1989 |
| EP | 0599055 | A1 | 6/1994 |
| EP | 0704657 | A2 | 4/1996 |
| EP | 1207273 | A2 | 5/2002 |
| EP | 1482246 | A1 | 12/2004 |
| JP | 2003286863 | A | 10/2003 |

* cited by examiner

GAS TURBINE HAVING AN IMPROVED COOLING ARCHITECTURE

CROSS REFERENCE TO PRIOR APPLICATIONS

This application is a continuation of International Application No. PCT/EP2009/051763, filed Feb. 16, 2009, which claims priority to Swiss Patent Application No. CH 00244/08, filed Feb. 20, 2008. The entire disclosure of both applications is incorporated by reference herein.

FIELD

The present invention relates to the field of thermal machines, and relates in particular to a thermal machine.

BACKGROUND

Gas turbines, for example inter alia under the type designation GT13E2, are operated with an annular combustion chamber. The combustion itself takes place preferably, but not exclusively, via premixing burners (referred to in the following text for short as burners), such as those disclosed in EP-A1-321 809 or EP-A1-704 657, with these documents and the further development of these premixing burners derived therefrom being an integrating component of this application. By way of example, an annular combustion chamber such as this is disclosed in DE-A1-196 44 378, a detail of which is reproduced in FIG. 1 of this application. The gas turbine 10 illustrated in FIG. 1 has a turbine housing 11 which, in the area of the combustion chamber 15, surrounds a plenum chamber 14 which is filled with compressed combustion air. The annular combustion chamber 15 is arranged concentrically around the central rotor 12 in the plenum chamber 14, and merges into a hot-gas channel 22. The area is bounded on the inside by an inner shell 21', and on the outside by an outer shell 21. The inner shell 21' and the outer shell 21 are each separated on a separating plane into an upper part and a lower part. The upper part and the lower part of the inner and outer shell 21', 21 are connected on the separating plane such that an annular area is formed which guides the hot gas produced by the burners 16 to the rotor blades 13 of the turbine. The separating plane is required for assembly and disassembly of the machine. The combustion chamber 15 itself is clad with special wall segments 17.

In the described embodiment, the inner and outer shell 21', 21 are cooled by convection. In this case, cooling air which enters the plenum chamber 14, arriving as a compressor air flow 23 from the compressor, flows predominantly in the opposite flow direction to the hot gas in the hot-gas channel 22. This cooling air then flows from the plenum chamber 14 on through a respective outer and inner cooling channel 20 and 20', which cooling channels are formed by cooling shirts 19, 19' which surround the shells 21, 21' at a distance. The cooling air flows along the shells 21, 21' in the cooling channels 20, 20' in the direction of the combustion chamber shroud 18, which surrounds the combustion chamber 15. There, the air is then available as combustion air to the burners 16.

The hot gas flows from the burners 16 to the turbine (stator blades 13) and in the process flows along the surfaces on the hot-gas side of the inner and outer shells 21' 21. The flow along these surfaces is, however, not homogeneous in this case, but is influenced by the arrangement of the burners 16.

The inner and outer shells 21', 21 are subject to both thermal and mechanical loads. In conjunction with the method of operation as well, these loads govern the life of the inner and outer shells 21', 21 and the inspection intervals which result from this. The non-uniformities in the flow as mentioned above occur both on the hot-gas side and on the cooling-air side. The non-uniformities on the hot-gas side result primarily from the burner arrangement. The non-uniformities on the cooling-air side are caused predominantly by fittings in the cooling channels 20, 20'.

SUMMARY OF THE INVENTION

An aspect of the invention is to provide a thermal machine, in particular a gas turbine, such that the load on the thermally particularly highly loaded installation parts is made uniform, thus lengthening the life of the installation overall.

In an embodiment, this uniformity is achieved by action on the cooling in that, in order to compensate for local non-uniformities in the thermal load on the shell and/or in the flow of the cooling medium in the cooling channel, the cooling shirt has corresponding local divergences in the guidance of the cooling medium flow. By this means, cooling can be increased locally in a simple manner in order to reduce corresponding local thermal fatigue loads.

One refinement of the invention is distinguished in that fittings which project into the cooling channel are provided on the outside of the shell, and in that the local constriction, which is caused by the fittings, of the cooling channel is compensated for by corresponding local contouring of the cooling shirt.

In particular, the local contouring of the cooling shirt may comprise a dome, which is curved outwards and extends over the area of the fittings, in the cooling shirt.

In another refinement of the invention, in order to compensate for an increased thermal load which occurs at a specific point on the shell, or in order to compensate for a local constriction, which is caused by fittings, in the cooling channel, means for introduction of additional cooling air into the cooling channel are provided at this point, wherein, when a cooling medium which is at a raised pressure is applied to the outside of the cooling shirt, the means for introduction of additional cooling air into the cooling channel preferably comprise cooling openings in the cooling shirt.

In particular, the relevant thermal machine may be a gas turbine with a combustion chamber, and the hot-gas channel may lead from the combustion chamber to a first row of stator blades. Furthermore, the combustion chamber may be formed in an annular shape and can be separated on a separating plane, with the hot-gas channel being bounded by an outer shell and an inner shell, and with an inner and an outer cooling channel being formed by a corresponding inner and outer cooling shirt.

The gas turbine preferably comprises a compressor for compression of inductive combustion air, the output of the compressor is connected to a plenum chamber, and the combustion chamber is arranged with the hot-gas channel, which is connected to it, and the adjacent cooling channels in the plenum chamber, and is surrounded by the plenum chamber, such that compressed air flows from the plenum chamber in the opposite direction to the hot-gas flow in the hot-gas channel, through the cooling channels to burners which are arranged on the combustion chamber. Furthermore, the burners may advantageously be in the form of premixing burners, in particular double-cone burners.

BRIEF DESCRIPTION OF THE DRAWINGS

The invention will be explained in more detail in the following text with reference to exemplary embodiments and in conjunction with the drawings. All the elements which are not required for immediate understanding of the invention have been omitted. Identical parts are provided with same reference symbols in the various figures. The flow direction of the media is indicated by arrows. In the figures.

APPROACHES TO IMPLEMENTATION OF THE INVENTION

Detailed Description

For the purposes of the invention, the distribution of the cooling air is influenced by a (local) adaptation of the cooling channel cross-sectional profile in conjunction with fittings which are present in the cooling channel such that a local adaptation of the cooling air mass flow and a local adaptation of the heat transfer between the shell and the cooling air are created. The cooling channel cross section is in this case defined by the existing contour of the inner and outer shells and modified contouring, that is to say contouring whose shape has been adapted, of the cooling air plates (cooling shirts) which are mounted on the inner and outer shells.

Figure 1:
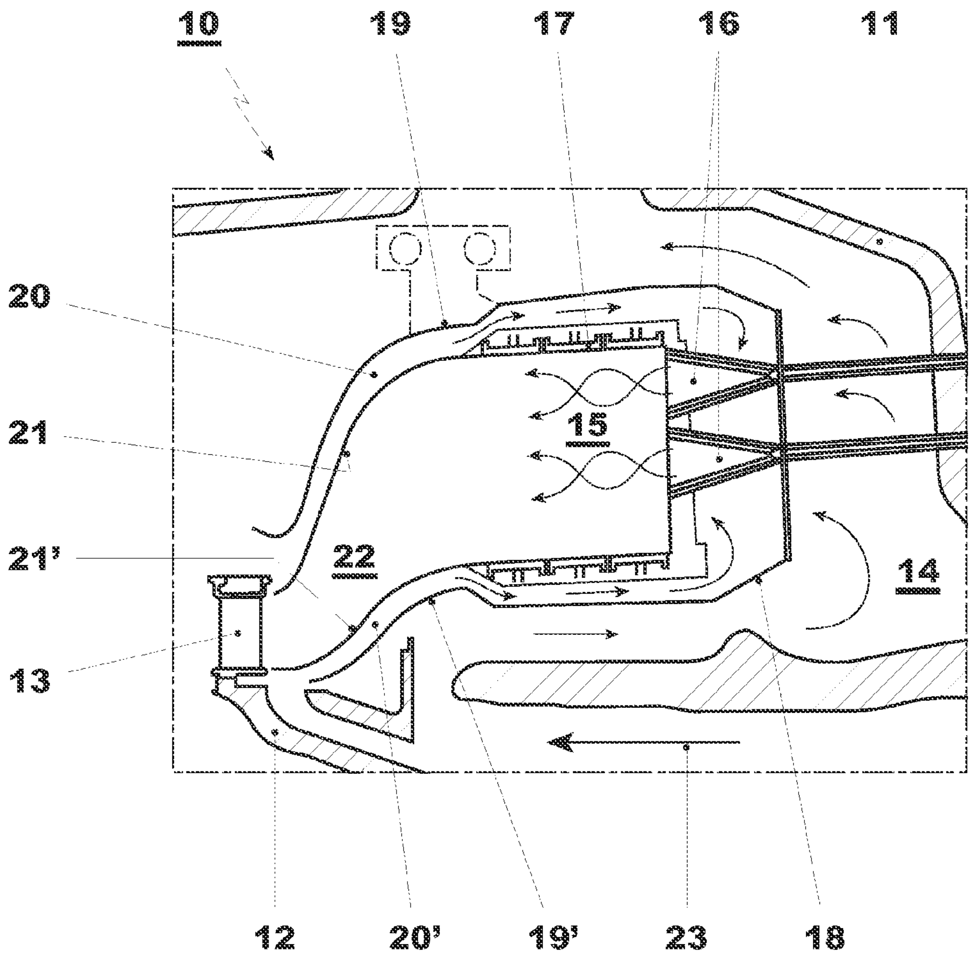
Prior Art FIG. 1
FIG. 1 shows the longitudinal section through a cooled annular combustion chamber of a gas turbine according to the prior art.
Figure 2:
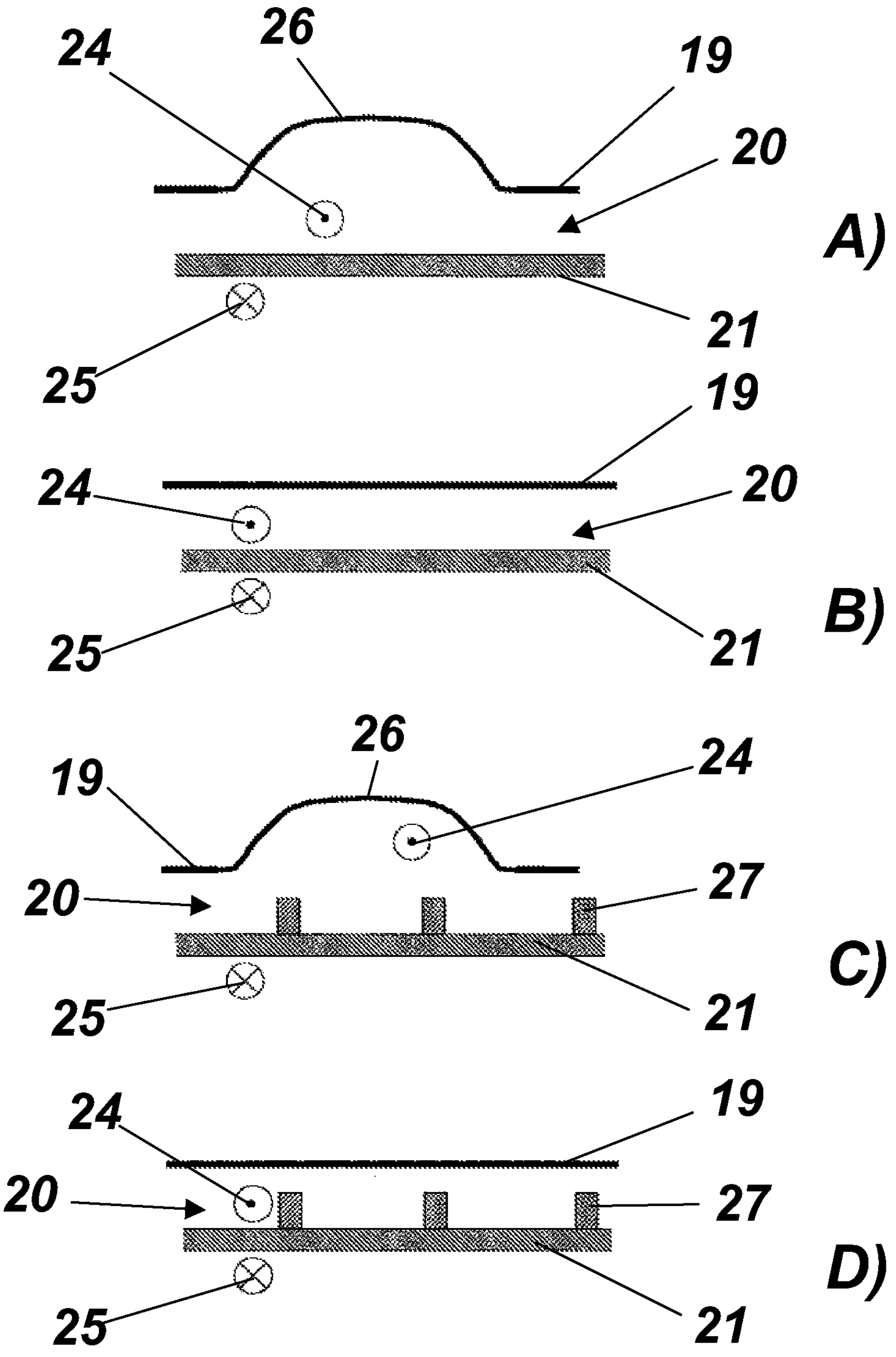
FIG. 2 shows, in a plurality of sub-FIGS. 2A to 2D, a cooling channel without any internal obstructions and with a local (dome-like) adaptation in the cooling shirt (FIG. 2A) according to one exemplary embodiment of the invention, and without adaptation (FIG. 2B), as well as a cooling channel which is equipped with ribs and has a local (dome-like) adaptation in the cooling shirt according to another exemplary embodiment of the invention (FIG. 2C), and without adaptation (FIG. 2D)

FIG. 2B shows, in a section transversely with respect to the flow direction of the cooling air 24 and of the hot gas 25 which is flowing in the opposite direction, a cooling channel which is formed between the shell 21 and the cooling shirt 19 and has a flow cross section which is constant for the illustrated detail. According to one exemplary embodiment of the invention, a local change can be now be produced in the flow cross section by providing the cooling shirt (locally) with an outward bulge in the form of a dome 26. The dome 26, which may extend over a relatively great length in the flow direction (at right angles to the plane of the drawing) (see FIGS. 3B and 3D) results in a local increase in the cooling channel cross section, which leads to locally better cooling and can thus contribute to reducing the increased thermal load which occurs at this point.

A step such as this (from FIG. 2D to FIG. 2C) is particularly worthwhile when there are ribs 27, which project inwards, as obstructions on the outside of the shell 21 in the cooling channel 20.

Figure 3:
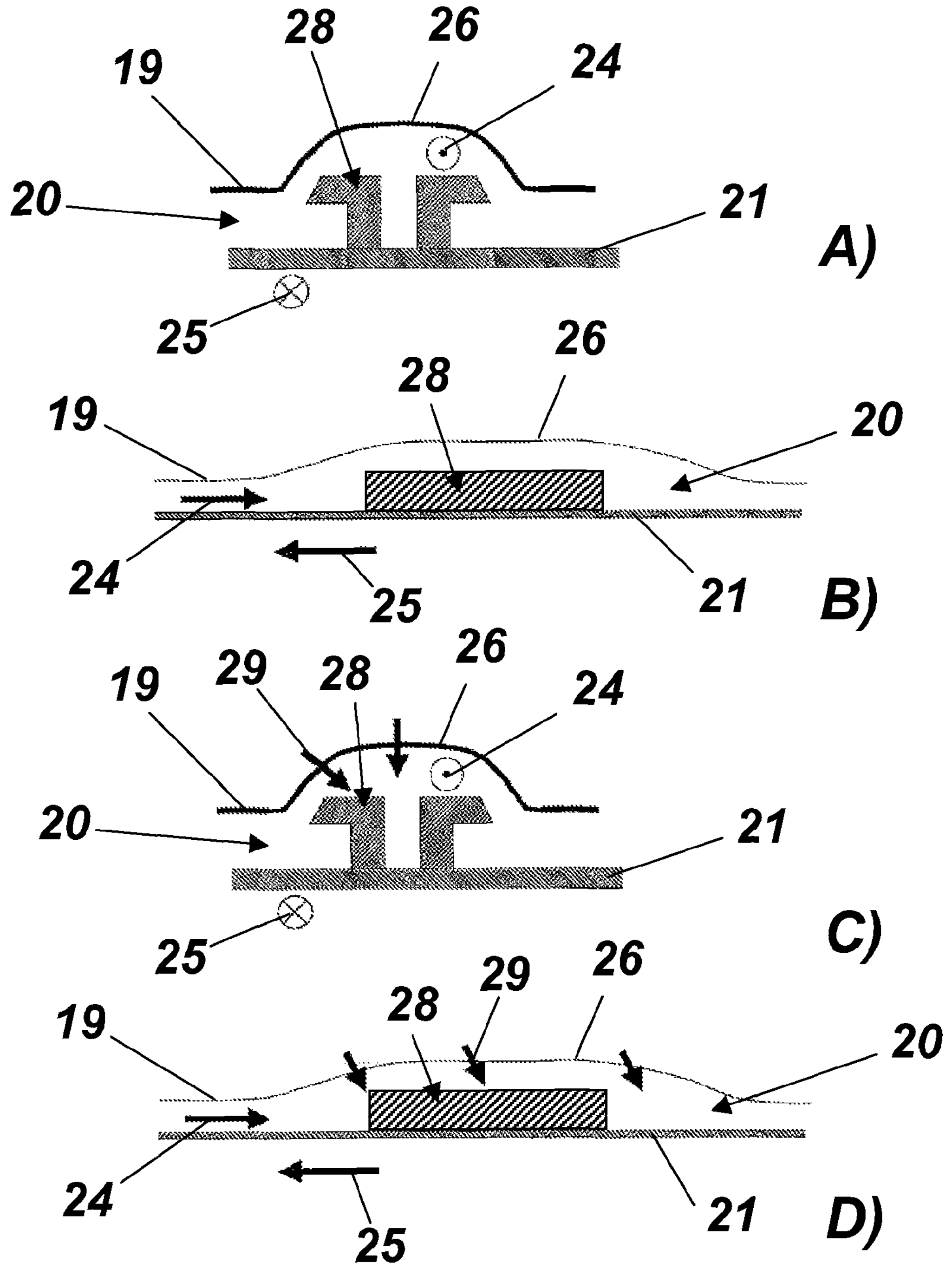
FIG. 3 shows, in a plurality of sub-FIG. 3A to 3D, a cooling channel with internal fittings and with a local (dome-like) adaptation in the cooling shirt according to a further exemplary embodiment of the invention, seen in the flow direction (FIG. 3A) and seen transversely with respect to the flow direction (FIG. 3B), as well as the arrangement as shown in FIGS. 3A, B with an additional cooling air supply according to another exemplary embodiment of the invention, seen in the flow direction (FIG. 3C) and seen transversely with respect to the flow direction (FIG. 3D)

It is particularly worthwhile to use a local dome 26 such as this in order to locally improve the cooling when—as shown in FIGS. 3A and 3B—there are special fittings 28, which impede the cooling flow, in the cooling channel 20. The width and length of the dome 26 are then expediently matched to the obstructing fittings 28.

In addition to or as an alternative to the dome-like local widening (26) of the cooling channel 20, it is also possible, as shown in FIGS. 3C and 3D, to pass additional cooling air 29 to the critical point through corresponding openings in the cooling shirt 19, however. To do this, it is necessary for cooling air at a greater pressure, in particular from the surrounding plenum chamber 14, to be available on the outside of the cooling shirt.

Figure 4:
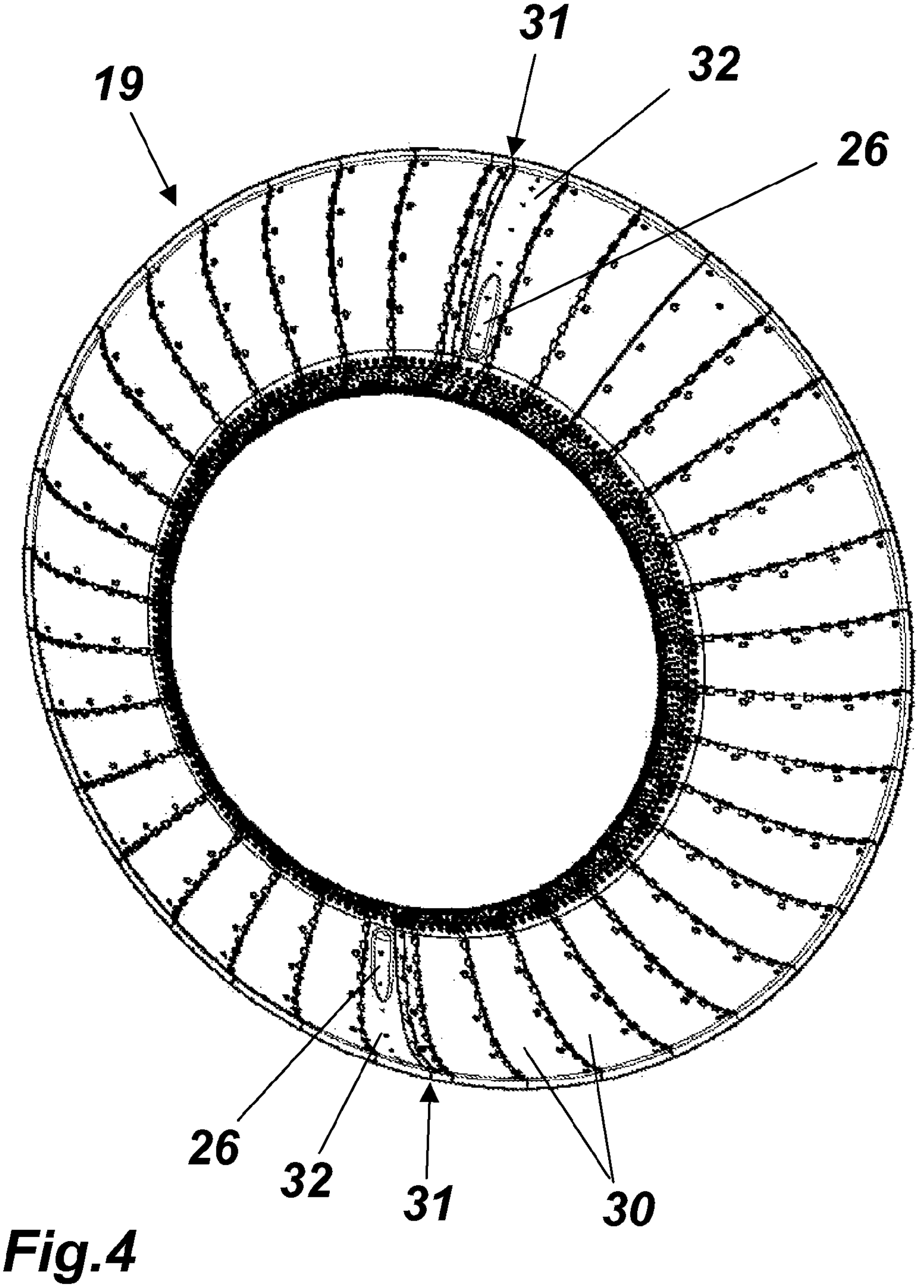
FIG. 4 shows a perspective side view of a cooling shirt, which can be separated on a separating plane, for a gas-turbine annular combustion chamber, with local adaptations according to another exemplary embodiment of the invention.
Figure 5:
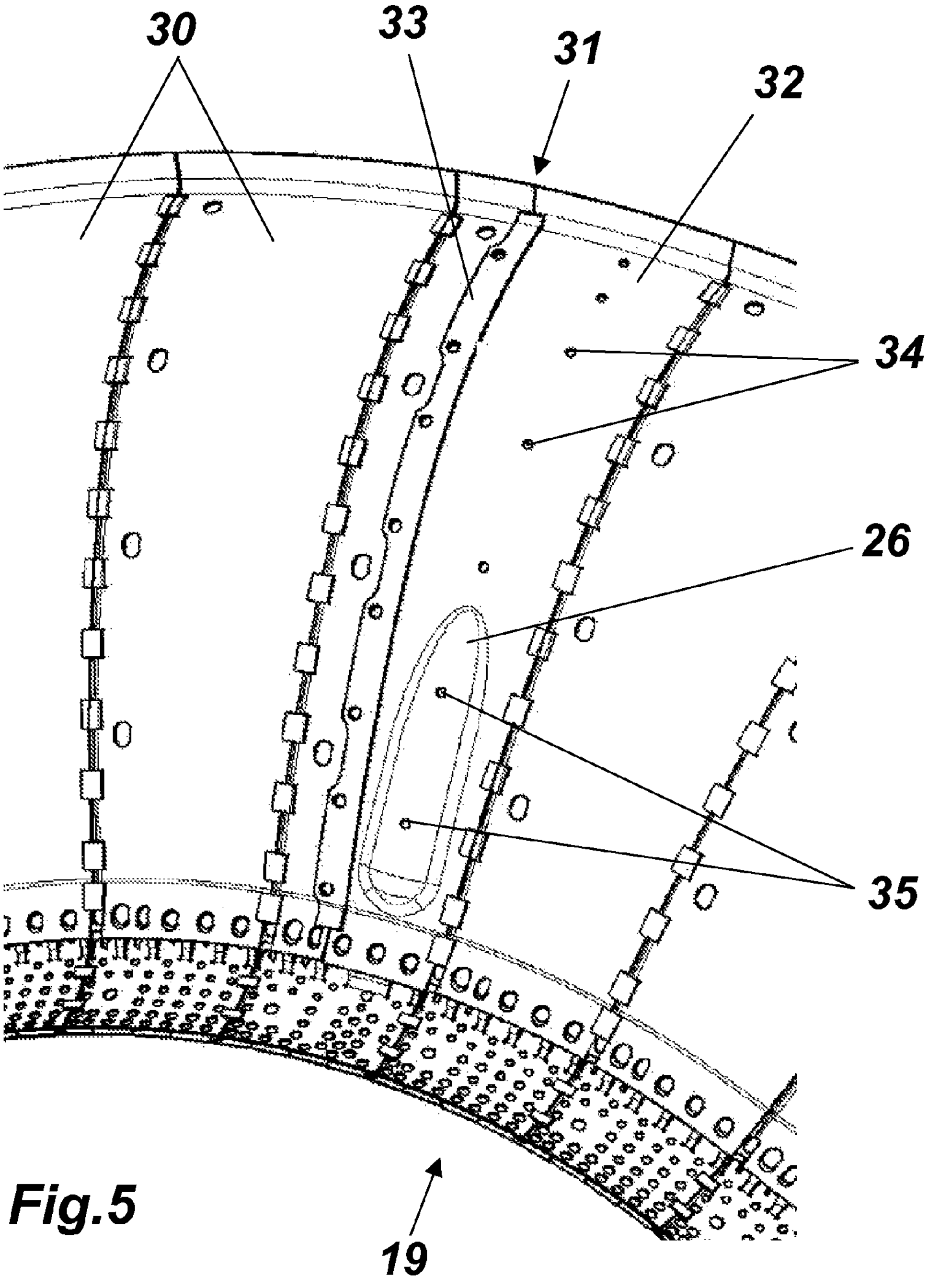
FIG. 5 shows an enlarged detail of the cooling shirt from FIG. 4 with an annular segment which has local adaptations.
Figure 6:
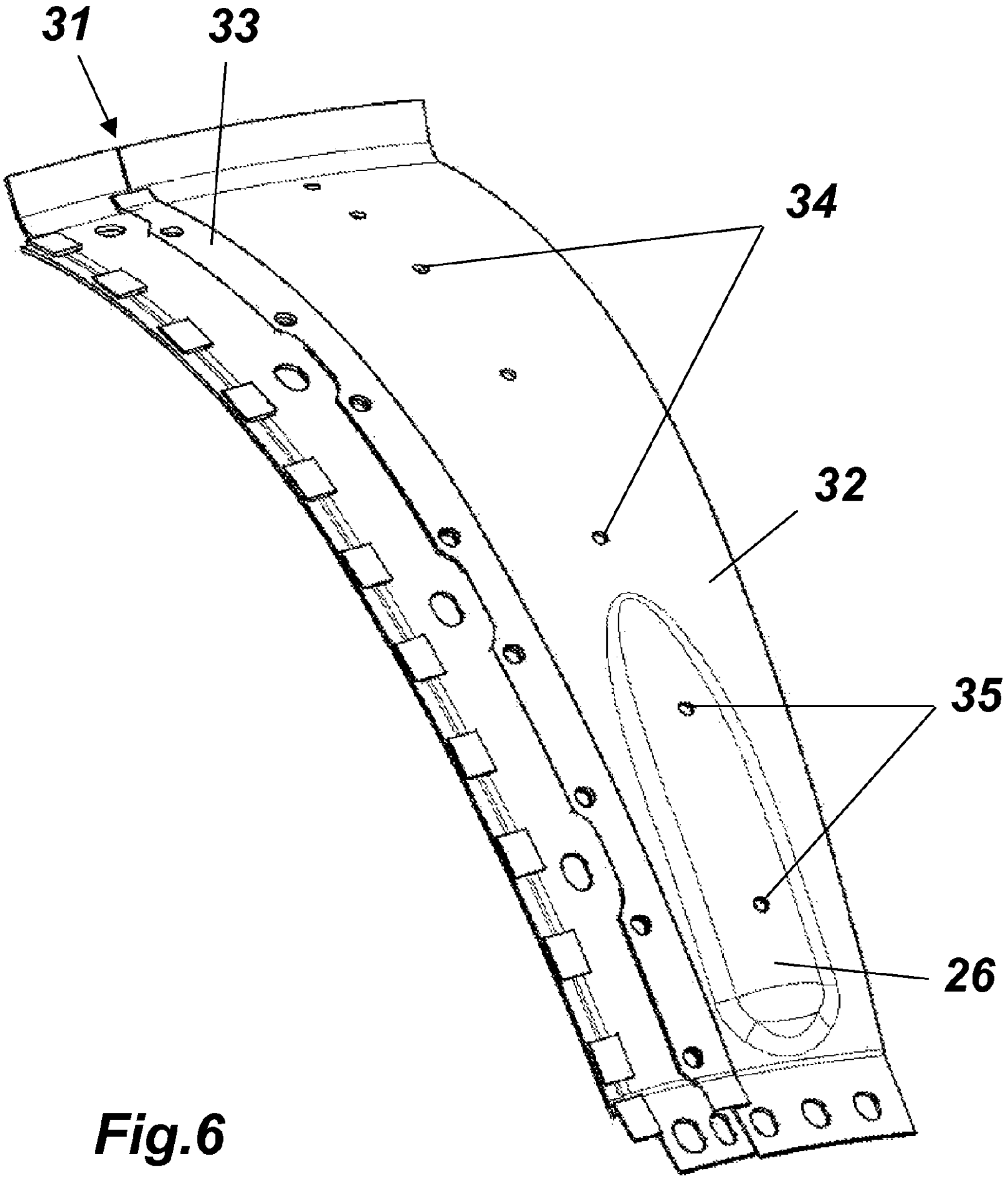
FIG. 6 shows, in its own right, the annular segment, which has the local adaptations, from FIG. 5.

FIGS. 4 to 6 show a perspective side view of an (outer) cooling shirt 19 (which can be separated on a separating plane 31) for a gas-turbine annular combustion chamber with local adaptations according to another exemplary embodiment of the invention. The cooling shirt 19 is composed of a plurality of identical segments 30. One selected segment 32 is in each case provided in the immediate vicinity of the separating plane 31 and has local modifications in order to optimize the coolant. As can be seen in particular in FIGS. 5 and 6, this selected segment 32, which is adjacent to the separating plane 31 and comprises a corresponding connecting strip 33, is equipped with an elongated dome 26 on one side. On the other side, cooling openings 35 and 34 are arranged in the segment plate both within the dome 26 and on an extension line of the dome 26, through which—analogously to FIGS. 3C and 3D—additional cooling air can enter the cooling channel from the outside.

Furthermore, it is feasible within the scope of the invention to change the geometry of the ribs 27 and/or of the fittings 28 themselves, in particular also in combination with modifications of the cooling shirt and with cooling openings for additional cooling air to enter.

LIST OF REFERENCE SYMBOLS

10 Gas turbine
11 Turbine housing
12 Rotor
13 Stator blade
14 Plenum chamber
15 Combustion chamber
16 Burner
17 Wall segment
18 Combustion chamber shroud
19 Outer cooling shirt
19' Inner cooling shirt
20 Outer cooling channel
20' Inner cooling channel
21 Outer shell (hot-gas channel)
21' Inner shell (hot-gas channel)
22 Hot-gas channel
23 Compressor air flow
24 Cooling air
25 Hot gas
26 Dome (cooling shirt)
27 Rib

28 Fittings
29 Additional cooling air
30, 32 Segment (cooling shirt)
31 Separating plane
33 Connecting strip
34, 35 Cooling opening

What is claimed is:

1. A thermal machine comprising:

a hot gas channel;

a shell bounding the hot gas channel;

a cooling shirt surrounding the shell;

a cooling channel disposed between the shell and the cooling shirt and configured to convection cool the hot gas channel with a cooling medium, wherein the cooling shirt includes at least one local divergence in the guidance of the cooling medium so as to compensate for non-uniformities in at least one of a thermal load on the shell and a flow of the cooling medium in the cooling channel; and fittings disposed on the outside of the shell, projecting into the cooling channel and configured to cause a local constriction of the cooling channel, wherein the at least one local divergence includes an outward bulge in the cooling shirt forming a local change in a cross section of the cooling channel and extending over an area of the fittings so as to compensate the local constriction.

2. The thermal machine as recited in claim 1, wherein the thermal machine is a gas turbine.

3. The thermal machine as recited in claim 1, wherein the cooling medium is cooling air.

4. The thermal machine as recited in claim 1, wherein the bulge forms a dome.

5. The thermal machine as recited in claim 1, further comprising an opening for introduction of a portion of the cooling medium into the cooling channel.

6. The thermal machine as recited in claim 5, wherein the opening is disposed at the local constriction in order to compensate for the local constriction.

7. The thermal machine as recited in claim 5, wherein the opening is disposed at a specific point on the shirt in order to compensate for an increased thermal load on the specific point on the shell.

8. The thermal machine as recited in claim 5, wherein the opening is disposed in the cooling shirt, and wherein a pressurized cooling medium is applied to an outside of the cooling shirt.

9. The thermal machine as recited in claim 2, further comprising a combustion chamber and a first row of stator blades, wherein the hot-gas channel extends from the combustion chamber to the first row of stator blades.

10. The thermal machine as recited in claim 9, wherein the combustion chamber is annular and separable on a separating plane, and wherein the shell includes an inner and an outer shell bounding the hot gas channel, and wherein the cooling channel includes an inner and an outer cooling channel formed by a corresponding inner cooling shirt and a corresponding outer cooling shirt of the cooling shirt.

11. The thermal machine as recited in claim 10, further comprising a compressor configured to compress incoming inductive combustion air;

a plenum chamber surrounding the combustion chamber, wherein an output of the compressor is connected to the plenum chamber, and wherein the combustion chamber is connected to the hot-gas channel and arranged within the inner cooling channel and outer cooling channel in the plenum chamber; and a burner disposed on the combustion chamber, wherein compressed air is configured to flow from the plenum chamber in a direction opposite a direction of hot-gas flow in the hot-gas channel and through the cooling channels to the burner.

12. The thermal machine as recited in claim 11, wherein the burner is in the form of a premixing burner.

* * * * *